July 17, 1934.  H. J. STEGEMAN ET AL  1,966,528
DRIVING CONNECTION
Original Filed July 1, 1931
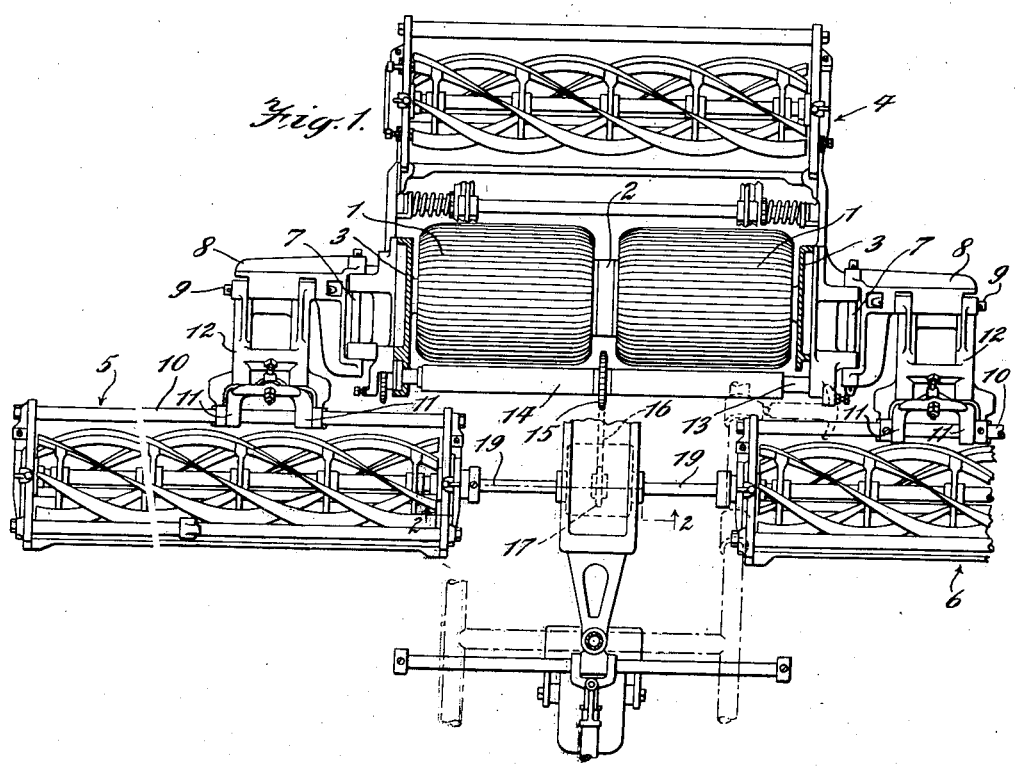
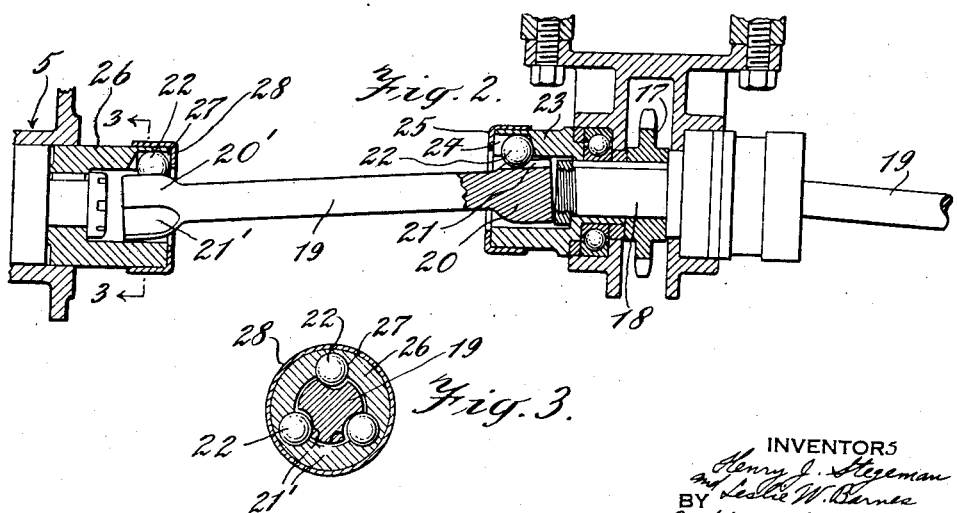
INVENTORS
Henry J. Stegeman
Leslie W. Barnes
BY
Gifford, Scull & Burgess
ATTORNEYS Patented July 17, 1934

1,966,528

UNITED STATES PATENT OFFICE 1,966,528

DRIVING CONNECTION

Henry J. Stegeman, Fairfield, and Leslie W. Barnes, Trumbull, Conn., assignors to The Locke Steel Chain Company, Bridgeport, Conn., a corporation of Connecticut Original application July 1, 1931, Serial No. 548,116. Divided and this application June 2, 1932, Serial No. 614,915

4 Claims. (Cl. 64—91)

This application is a division of our copending application, Serial No. 548,116, filed July 1, 1931. The invention relates to a novel and improved driving connection, the novel features of which will be best understood from the following description and the annexed drawing, in which we have shown a selected embodiment of the invention and in which:

Fig. 1 is a plan view of a lawn mower having our invention applied thereto and illustrating one use to which the invention may be put.

Fig. 2 is a section taken longitudinally of the driving connection on approximately the line 2—2 of Fig. 1.

Fig. 3 is a section taken on the line 3—3 of Fig. 2.

The invention is shown and described in connection with a lawn mower with which it has been found to have particular utility. The lawn mower shown is one having ground-engaging rolls 1 connected by a differential driving mechanism 2 and supporting a frame 3 upon which are pivotally mounted cutter units. The details of these units will not be described, it being sufficient for the sake of this application to say that there are three of them shown and designated 4, 5, and 6.

The unit 4 is pivoted on the frame in front of the rolls 1, and the units 5 and 6 are disposed one on each side of the mower and mounted upon pivots 7 extending in the direction of travel. These pivots support brackets 8 which, in turn, carry pivots 9 extending transversely to the direction of travel and supporting the cutters 5 and 6 by means of rods 10 slidably mounted in ears 11 of the brackets 12 mounted on the pivots 9. By this arrangement the cutters 5 and 6 may be moved lengthwise of the rolls 1 or transversely of the direction of travel by sliding the rod 10 of a cutter in the ears of the corresponding bracket 12, all in the manner more fully described in our copending application.

The mechanism shown is intended to be power driven, and the cutter 4 is driven by a suitable mechanism, the details of which are not necessary for an understanding of this invention and which have therefore been omitted. The cutters 5 and 6 may be driven from a shaft 13 which may also be conveniently used for carrying cleaning rolls 14 adapted to clean the rolls 1. The shaft 13 has centrally mounted thereon a sprocket 15 engaging a chain 16 which, in turn, engages a sprocket 17. This sprocket is keyed to a driving shaft 18 as best shown in Fig. 2, and this shaft drives the cutters 5 and 6 through driven shafts 19. The two shafts 19 are identical in construction, and therefore a description of only one of them will be given.

In a device such as a lawn mower of the class described, a certain amount of motion is necessary in a direction transverse to the axes of the driving and driven shafts, these axes normally being coincident. At the same time it is desirable to prevent end thrust which would add to or detract from the pressure exerted by the cutters 5 or 6 upon the grass and thus cause variation in the length of grass cut. Similar disadvantages would result from the presence of end thrust in other machines used for different purposes.

The connection which we have devised and which has been found to give excellent results in practice is best shown in Figs. 2 and 3, in which it will be seen that each shaft 19 is provided with an enlarged end 20 having a plurality of longitudinally extending open-ended grooves 21 therein and in which are received members 22 loosely held in position in said grooves. In the present units these members are shown as balls held in a cage 23. The cage is provided with grooves 24 extending longitudinally of the shaft 19, and the cage itself is keyed to the shaft 18 so that it is in effect part of that shaft and will be so considered. A suitable cap 25 may be fixed to the cage 23 to close the ends of the grooves 24 so as to prevent displacement of the balls 22 therefrom while permitting limited longitudinal movement of the balls in those grooves.

The shaft 19 is similarly provided at its other end with an enlargement 20' received in the end of a shaft 26 provided with groove 27 closed by a cap 28 corresponding in all respects to similar elements on the driving shaft 18. The grooves 27 likewise have balls 22 therein received in grooves 21' in the end 20' of the shaft 19. In other words, the constructions of the two ends of the shaft 19 are identical. In both instances, the balls 22 are held against all but free longitudinal movement in the grooves 24 and 27 of the cages 23 and 26, the circumferential extent of the grooves being such as to prevent displacement of the balls transversely of the grooves, as plainly shown in Fig. 3. However, the grooves 21 and 21' in the parts 20 and 20' are laid out from the centers of the balls but with larger radii than the balls. This permits the shaft 19 to swing out of axial alignment with the cages 23 and 26 without cramping the balls.

In each instance the end of the shaft 19 is received within an axially extending recess in another shaft, and the balls 22 received within the grooves 21 or 21' constitute a driving connection. The grooves 24 in which the balls 22 are held are spaced around the recess or opening, and it will be seen that there is a single set of these grooves. The grooves being adjacent the outer end of the opening and the opening being of sufficient size, the shaft received therein may rock to a desired extent on the balls in the grooves. This driving connection is one which is flexible, permitting a substantial play between driving and driven shaft in any direction transversely to the normally common axis of the driving and driven shafts. At the same time, since the balls 22 are freely movable axially of both shafts, it will be seen that there is no end thrust transmitted by one shaft to the other. The connection is one which is easily broken by movement of one of the cutters, for example the cutter 5, axially of the shaft 19, when it will be seen that the balls 22 will merely roll along the open-ended grooves 21 or 21' until the cutter is disconnected from the shaft 18 by the shaft 19 dropping out of the cages 23 and/or 26. The absence of any thrust does away with any tendency to either lift or depress the cutter driven by the shaft 19, thus avoiding an objection which would be present if a flat key spline were used as a driving connection. There is absolutely no binding of any joints between the various elements.

While we have shown the invention as embodied in a specific form, it is to be understood that various changes in details may be made without departing from the scope of the invention, and we therefore do not intend to limit ourselves except by the appended claims.

We claim:

1. In combination, a driving shaft and a driven shaft, one of said shafts having at one end thereof an opening in which an end of the other shaft may be received, said opening having a plurality of grooves spaced around the wall thereof and extending longitudinally of said shafts, said grooves being arranged in a single set adjacent the end of the shaft, a single ball disposed in each of said grooves and rotatable therein and movable lengthwise thereof, and means preventing displacement of the balls from their grooves, said other shaft end having longitudinally extending grooves in which said balls are received and in which they may move lengthwise, said opening being of sufficient size transversely of the shafts to permit a rocking movement of one shaft relative to the other on said balls.

2. In combination, a driving shaft and a driven shaft, one of said shafts having at one end thereof an opening in which an end of the other shaft may be received, said opening having a plurality of grooves spaced around the wall thereof and extending longitudinally of said shafts, said grooves being arranged in a single set adjacent the end of the shaft, a single ball disposed in each of said grooves and rotatable therein and movable lengthwise thereof, and means preventing displacement of the balls from their grooves, said other shaft end having longitudinally extending open-ended grooves in which said balls are received and in which they may move lengthwise, said opening being of sufficient size transversely of the shafts to permit a rocking movement of one shaft relative to the other on said balls.

3. In combination, a driving shaft and a driven shaft, one of said shafts having at one end thereof an opening in which an end of the other shaft may be received, said opening having a plurality of grooves spaced around the wall thereof and extending longitudinally of said shafts, said grooves being arranged in a single set adjacent the end of the shaft, a single ball disposed in each of said grooves and rotatable therein and movable lengthwise thereof, and means preventing displacement of the balls from their grooves, said other shaft end having longitudinally extending grooves in which said balls are received and in which they may move lengthwise, said opening being of sufficient size transversely of the shafts to permit a rocking movement of one shaft relative to the other on said balls, and said grooves in said shaft end being cylindrical with the radii larger than the radii of the balls received therein.

4. In combination, a shaft section having adjacent each of its opposite ends a plurality of grooves spaced around the section and extending longitudinally thereof and extending to the ends of the section, said grooves having cylindrical surfaces, two shafts disposed in approximate alignment with said section, each of said shafts having openings in their ends in which the ends of said section may be received and the walls of said openings having grooves mating with the grooves in the ends of the section, a single ball disposed in each pair of mating grooves and movable lengthwise therein, means preventing displacement of said balls from the grooves in the walls of said openings, and means supporting one of said shafts for movement lengthwise thereof to permit removal of said section to disconnect said shafts.

HENRY J. STEGEMAN.
LESLIE W. BARNES.